United States Patent
Säll et al.

(10) Patent No.: US 11,383,251 B2
(45) Date of Patent: Jul. 12, 2022

(54) NOZZLE DEVICE AND A METHOD OF MANUFACTURING THE SAME

(71) Applicant: SHL Medical AG, Zug (CH)

(72) Inventors: Daniel Säll, Segeltorp (SE); Johan Midbjer, Nacka (SE)

(73) Assignee: SHL MEDICAL AG, Zug (CH)

( * ) Notice: Subject to any disclaimer, the term of this patent is extended or adjusted under 35 U.S.C. 154(b) by 318 days.

(21) Appl. No.: 16/616,359

(22) PCT Filed: May 25, 2018

(86) PCT No.: PCT/EP2018/063769
§ 371 (c)(1),
(2) Date: Nov. 22, 2019

(87) PCT Pub. No.: WO2018/219798
PCT Pub. Date: Dec. 6, 2018

(65) Prior Publication Data
US 2020/0094268 A1    Mar. 26, 2020

(30) Foreign Application Priority Data
May 31, 2017   (EP) ..................... 17173695

(51) Int. Cl.
*B05B 1/14* (2006.01)
*B05B 15/40* (2018.01)
*B01D 63/08* (2006.01)

(52) U.S. Cl.
CPC .............. *B05B 1/14* (2013.01); *B01D 63/08* (2013.01); *B05B 15/40* (2018.02)

(58) Field of Classification Search
CPC ............ B05B 1/14; B05B 15/40; B01D 63/08
(Continued)

(56) References Cited

U.S. PATENT DOCUMENTS

| 6,863,224 | B2 | 3/2005 | Terada et al. |
| 8,936,160 | B2* | 1/2015 | Van Rijn ............ B01D 67/0093 239/596 |

(Continued)

FOREIGN PATENT DOCUMENTS

| CN | 1087843 A | 6/1994 |
| CN | 1237119 A | 12/1999 |

(Continued)

OTHER PUBLICATIONS

Chinese Office Action for CN App. No. 201880031702.2, dated Nov. 13, 2020.

(Continued)

*Primary Examiner* — Steven J Ganey
(74) *Attorney, Agent, or Firm* — McDonnell Boehnen Hulbert & Berghoff LLP

(57) ABSTRACT

The present disclosure relates to a nozzle device for atomisation of a liquid, wherein the nozzle device comprises: a substrate, a sieve-side membrane comprising a plurality of sieve-side orifices, the sieve-side membrane being provided on a sieve-side of the substrate, a spray-side membrane comprising a plurality of spray-side orifices, the spray-side membrane being provided on a spray-side of the substrate, wherein the substrate has a first cavity portion extending to the sieve-side membrane, and a second cavity portion extending from the first cavity portion to the spray-side membrane, thereby providing fluid communication, along a fluid communication axis, between the sieve-side orifices and the spray-side orifices, the first cavity portion having a larger cross-sectional area than a cross-sectional area of the second cavity portion, the cross-sections being with respect to the fluid communication axis.

16 Claims, 6 Drawing Sheets

(58) Field of Classification Search
USPC .................. 239/548, 553.3, 575, 590.3, 596; 128/200.14
See application file for complete search history.

(56) References Cited

U.S. PATENT DOCUMENTS

| | | |
|---|---|---|
| 9,566,398 B2 | 2/2017 | Heskamp et al. |
| 2004/0050953 A1 | 3/2004 | Terada et al. |
| 2012/0012105 A1 | 1/2012 | Heskamp et al. |
| 2016/0158464 A1 | 6/2016 | Hijlkema et al. |

FOREIGN PATENT DOCUMENTS

| | | |
|---|---|---|
| CN | 1279653 A | 1/2001 |
| CN | 1397991 A | 2/2003 |
| CN | 102438760 A | 5/2012 |
| CN | 105408028 A | 3/2016 |
| DE | 2613002 A1 | 12/1976 |
| JP | H07-80369 A | 3/1995 |
| JP | 2004209983 A | 7/2004 |
| JP | 2013-202498 A | 10/2013 |
| TW | 508271 | 11/2002 |
| WO | 2015194962 A1 | 12/2015 |

OTHER PUBLICATIONS

Korean Office Action for KR Application No. 2019-7035298, dated Dec. 21, 2020.
European Search Report issued in European Patent Application No. 17173695 dated Aug. 9, 2017.
International Search Report issued in International Application No. PCT/EP2018/063769 dated Jun. 28, 2018.
Search Report issued in Taiwanese Patent Application No. 107118135 dated Apr. 15, 2019.

\* cited by examiner

NOZZLE DEVICE AND A METHOD OF MANUFACTURING THE SAME

CROSS REFERENCE TO RELATED APPLICATIONS

The present application is a U.S. National Phase Application pursuant to 35 U.S.C. § 371 of International Application No. PCT/EP2018/063769 filed May 25, 2018, which claims priority to European Patent Application No. 17173695.2 filed May 31, 2017. The entire disclosure contents of these applications are herewith incorporated by reference into the present application.

TECHNICAL AREA

The present disclosure generally relates to nozzle devices. In particular, it relates to a nozzle device for atomisation of a liquid and to a method of manufacturing such a nozzle device.

BACKGROUND

A nozzle device may be configured to atomise a liquid, i.e. to make an aerosol of the liquid. A nozzle device of this type may comprise a substrate having a filter side provided with a filter for filtering out any undesired larger particles contained in the liquid to be atomised. The substrate may also have a spray-side provided with a spray-membrane having a plurality of orifices. The spray-membrane and the filter are configured to be in liquid communication. In the process of atomisation, the liquid first passes the filter where a slight pressure drop is obtained. The filtered liquid subsequently passes through the orifices of the membrane, whereby the liquid is atomised.

An example of such a nozzle device is disclosed in US2005/0178862 A1. The nozzle device has a filtration plate provided with at least one filtration orifice and a micromachined reinforced nozzle plate, which may produce small liquid droplets in air or into a liquid with a narrow droplet size distribution and make small air bubbles into a liquid.

The pressure drop over the nozzle device may for certain applications, for example for spraying drugs having a high viscosity, be required to be relatively large, typically a plurality of bar, such as 30-50 bar. The nozzle device disclosed in US2005/0178862 may not be robust enough for such applications, and the nozzle plate may therefore suffer breakage.

SUMMARY

In view of the above, a general object of the present disclosure is to provide a nozzle device which solves or at least mitigates problems of the prior art.

There is hence according to a first aspect of the present disclosure provided a nozzle device for atomisation of a liquid, wherein the nozzle device comprises: a substrate, a sieve-side membrane comprising a plurality of sieve-side orifices, the sieve-side membrane being provided on a sieve-side of the substrate, a spray-side membrane comprising a plurality of spray-side orifices, the spray-side membrane being provided on a spray-side of the substrate, wherein the substrate has a first cavity portion extending to the sieve-side membrane, and a second cavity portion extending from the first cavity portion to the spray-side membrane, thereby providing fluid communication, along a fluid communication axis, between the sieve-side orifices and the spray-side orifices, the first cavity portion having a larger cross-sectional area than a cross-sectional area of the second cavity portion, the cross-sections being with respect to the fluid communication axis.

The second cavity portion and the first cavity portion hence define a channel extending through the substrate, with a decreasing cross-sectional area as the channel transitions from the first cavity portion to the second cavity portion.

Since the second cavity portion is smaller in cross-sectional area than the first cavity portion the area of the spray-side membrane which is exposed to pressure can be made substantially smaller than the corresponding area of the sieve-side membrane. A more robust nozzle device may thus be provided.

According to one embodiment any cross-sectional area of the first cavity portion is larger than any cross-sectional area of the second cavity portion. Thus any cross-sectional area of the first cavity portion along the length of the first cavity portion, with respect to the fluid communication axis, is larger than any cross-sectional area of the second cavity portion along the length of the second cavity portion, with respect to the fluid communication axis.

The cross-sectional area of the first cavity may be constant along the fluid communication axis. The cross-sectional area of the second cavity may be constant along the fluid communication axis.

The second cavity portion may according to one example be in fluid communication with only a single spray-side orifice.

The second cavity portion may according to another example be configured so that each spray-side orifice is arranged adjacent to two oppositely arranged inner walls of the second cavity portion. This means that between the edge of a wall of the second cavity portion and the opposite edge of a wall of the second cavity portion there is only provided a single spray-side orifice. There may however be a plurality of spray-side orifices arranged in a single row parallel with the longitudinal extension of the second cavity portion along the surface of the spray-side membrane.

The spray-side orifice configurations according to the examples above reduces the risk of aerosol droplets colliding, thereby forming larger droplets. It is in certain applications, for example medical applications, desirable to maintain the fine droplets of the aerosol.

According to one embodiment each spray-side orifice has a cross-sectional area greater than or equal to the cross-sectional area of any of the sieve-side orifices. This reduces the risk that a large molecule present in the liquid will clog the spray-side orifices. Such a molecule could in certain applications theoretically be able to travel through a sieve-side orifice, for example if the orientation of the molecule was in a certain direction, in which the cross-sectional area is smaller, when reaching the sieve-side membrane.

According to one embodiment the number of sieve-side orifices is greater than the number of spray-side orifices. In this way, a lower pressure drop over the sieve-side membrane may be obtained. The higher pressure drop over the spray-side membrane is compensated by its increased mechanical strength obtained due to it having a much smaller active area than the active area of the sieve-side membrane. With active area is here meant the area of the respective membrane provided with spray-side orifices and sieve-side orifices.

According to one embodiment an axial length, along the fluid communication axis, of the first cavity portion is equal to an axial length of the second cavity portion. The thickness of the walls provided by the second cavity portion(s)

towards the spray-side membrane can hence have the same length dimension as the first cavity portion.

According to one embodiment the sieve-side orifices occupy a larger area on the sieve-side membrane than the spray-side orifices occupy on the spray-side membrane.

According to one embodiment the substrate comprises a first wafer provided with the first cavity portion and a second wafer provided with the second cavity portion, the first wafer and the second wafer being bonded to each other to form the substrate.

According to one embodiment the substrate is made of a semiconductor material. The semiconductor material may for example be silicon.

According to one embodiment the sieve-side membrane and the spray-side membrane comprise one of a non-oxide ceramic, an oxide, silicon or metal. An example of a suitable non-oxide ceramic is silicone nitride.

According to one embodiment the substrate comprises a plurality of second cavity portions extending from the first cavity portion to the spray-side membrane, thereby providing fluid communication, along a respective fluid communication axis, between the sieve-side orifices and the spray-side orifices, the first cavity portion having a larger cross-sectional area than a cross-sectional area of any of the second cavity portions.

Each second cavity portion may hence be in fluid connection with a respective set of a plurality of spray-side orifices of the spray-side membrane.

By providing a substrate having a plurality of second cavity portions, more spray-side orifices may be provided in the spray-side membrane, and thus a higher throughput may be provided, while maintaining the higher mechanical strength of the spray-side membrane, provided by the smaller cross-sectional area of the second cavity portions.

According to one embodiment any cross-sectional area of any of the first cavity portions is larger than any cross-sectional area, with respect to the fluid communication axis, of the second cavity portion.

According to one example, the substrate may be provided with a plurality of second cavity portions and a plurality of first cavity portions. Each first cavity portion may be in fluid communication with only one second cavity portion. In this example, each first cavity portion is thus connected with a respective one of the second cavity portions. The number of fluid communication channels through the substrate, from the sieve-side orifices of the sieve-side membrane to spray-side orifices of the spray-side membrane can in this case be equal to the number of first cavity portions, which can be equal to the number of second cavity portions.

According to one embodiment a total cross-sectional area of the second cavity portions with respect to the fluid communication axes is smaller than an area of the sieve-side membrane provided with the sieve-side orifices.

The sieve-side membrane does not require the same mechanical strength as the spray-side membrane does, because the forces acting on the sieve-side membrane are small relative to those acting on the spray-side membrane.

There is according to a second aspect of the present disclosure provided a medicament delivery device comprising a nozzle device according to the first aspect.

The nozzle device is the delivery member of the medicament delivery device. The medicament delivery device is configured such that medicament passes through the nozzle device during administration to thereby atomise the medicament, creating an aerosol.

According to one embodiment the medicament delivery device is an inhaler or an eye dispenser.

There is according to a third aspect of the present disclosure provided a method of manufacturing a nozzle device for atomisation of a liquid, wherein the method comprises: a) providing a first wafer, c) providing a sieve-side membrane layer onto a first side of the first wafer, d) providing sieve-side orifices in the sieve-side membrane layer thereby obtaining a sieve-side membrane, e) providing a first cavity portion in the first wafer, extending to the sieve-side membrane, f) providing a second wafer, h) providing a spray-side membrane layer onto a first side of the second wafer, i) providing spray-side orifices in the spray-side membrane layer thereby obtaining a spray-side membrane, j) providing a second cavity portion in the second wafer, extending to the spray-side membrane, and k) bonding a second side of the first wafer with a second side of the second wafer thereby forming a substrate, with the sieve-side membrane forming a sieve-side of the nozzle device and the spray-side membrane forming a spray-side of the nozzle device, whereby the second cavity portion extends from the first cavity portion to the spray-side membrane, thereby providing fluid communication, along a fluid communication axis, between the sieve-side orifices and the spray-side orifices, the first cavity portion having a larger cross-sectional area than the cross-sectional area of the second cavity portion, the cross-section being with respect to the fluid communication axis.

The steps of the method may not necessarily have to be carried out in the order above. Steps f) to j) may for example be carried out prior to steps a) to e).

According to one embodiment steps d), e), i) and j) involves etching.

According to one embodiment step j) involves providing a plurality of second cavity portions in the second wafer, each extending to the spray-side membrane.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
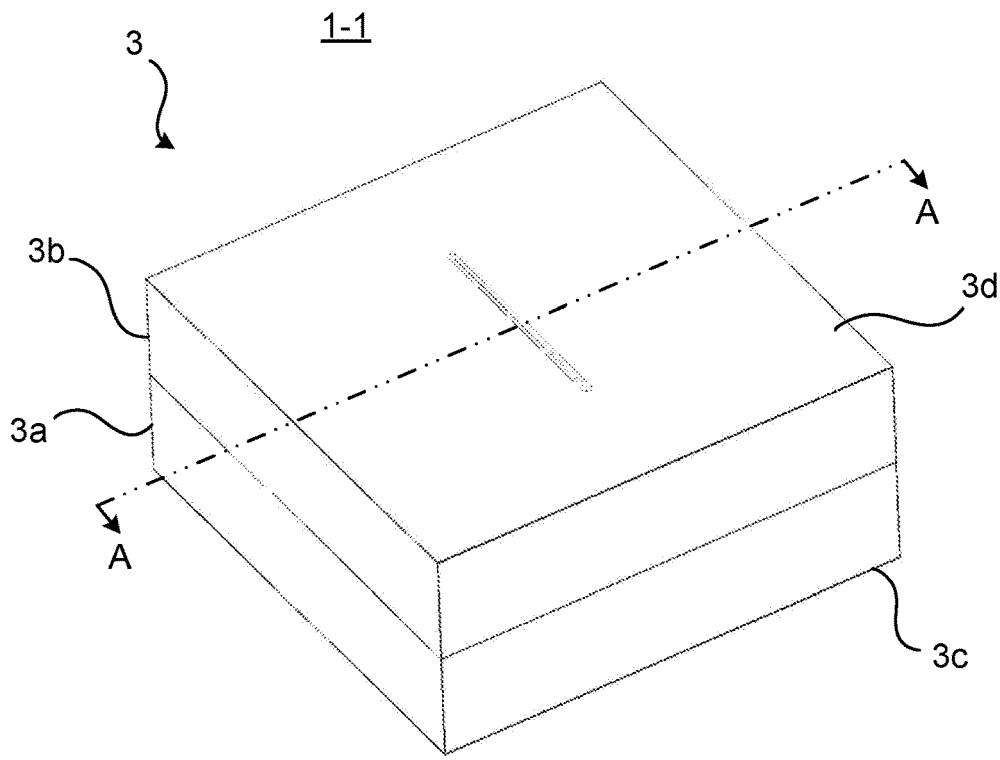
FIG. 1 is a perspective view of a schematic example of a nozzle device.

FIG. 1 shows a first example of a nozzle device configured to atomise liquids. The nozzle device 1-1 comprises a substrate 3. The substrate 3 comprises a first wafer 3*a* and a second wafer 3*b* which have been bonded together, thus forming the substrate 3. The substrate 3 has a sieve-side 3*c*, or filter side, and a spray-side 3*d* arranged opposite to the sieve-side 3*c*.

Figure 2A:
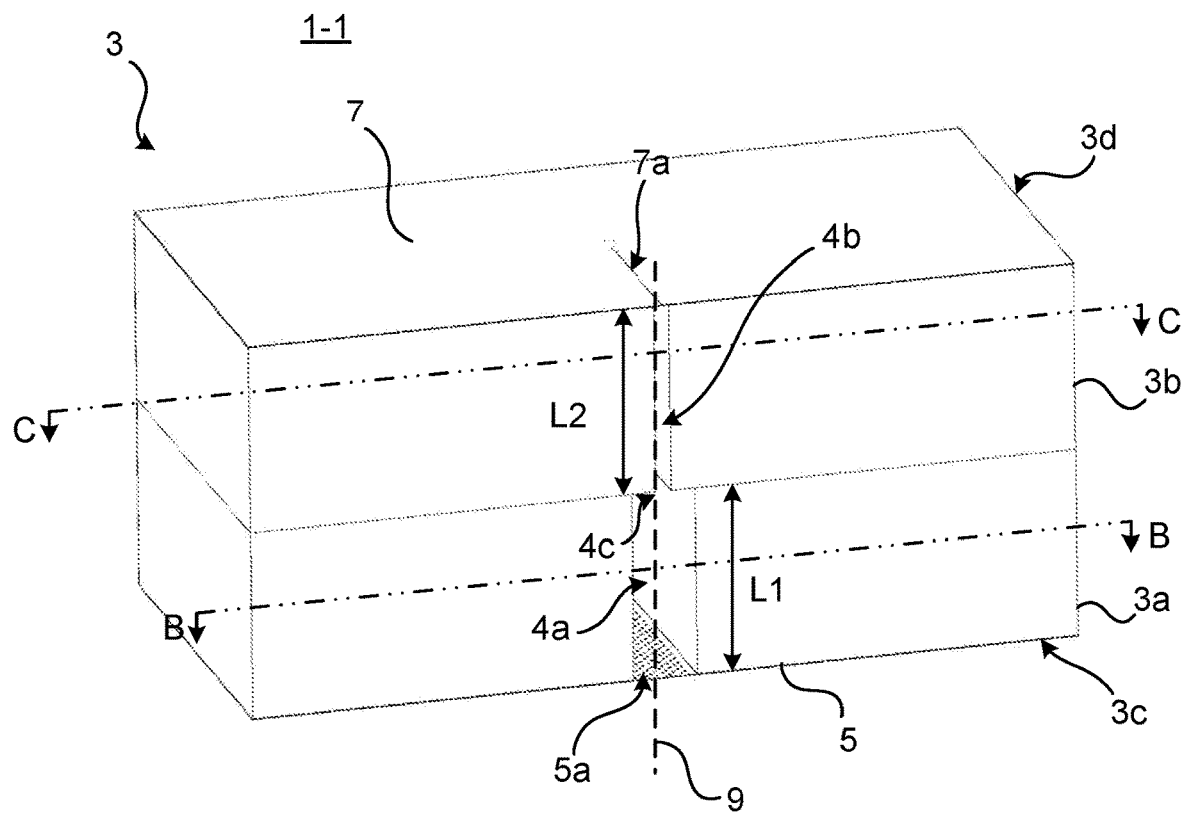
FIG. 2a is a section along lines A-A through the nozzle device in FIG. 1.

Turning now to FIG. 2*a*, the exemplified nozzle device 1-1 will be described in more detail. The nozzle device 1-1 further comprises a sieve-side membrane 5 provided on the sieve-side 3*c* of the substrate 3. The nozzle device 1-1 also comprises a spray-side membrane 7 provided on the spray-side 3*d* of the substrate 3.

The sieve-side membrane 5 is provided with a plurality of sieve-side orifices 5*a*. The spray-side membrane 7 is provided with a plurality of spray-side orifices 7*a*. Each sieve-side orifice 5*a* has a cross-section, with respect to its axial extension, which is smaller or equal to a cross-section of any of the spray-side orifices 7*a*, with respect to the axial extension of the spray-side orifices 7*a*.

The substrate 3 has a first cavity portion 4*a* extending to the sieve-side membrane 5. The first cavity portion 4*a* extends to the sieve-side orifices 5*a*. The substrate 3 has a second cavity portion 4*b* extending from the first cavity portion 4*a* to the spray-side membrane 7. The second cavity portion 4*b* has a mouth 4*c* which opens into the first cavity portion 4*a*. The second cavity portion 4*b* extends from the first cavity portion 4*a* to the spray-side orifices 7*a*. The sieve-side membrane 5, and in particular the sieve-side orifices 5*a*, is hence in fluid communication with the spray-side membrane 7, in particular with the spray-side orifices 7*a* via the first cavity portion 4*a* and the second cavity portion 4*b*. This fluid communication is provided along a fluid communication axis 9 extending from the sieve-side membrane 5 to the spray-side membrane 7.

According to the example shown in FIG. 2*a*, the axial length L1 of the first cavity portion 4*a*, along the fluid communication axis 9, is equal to the axial length L2 of the second cavity portion 4*b*. The first wafer 3*a* and the second wafer 3*b* are hence equally thick. According to one variation, the thickness of the first wafer 3*a* and the second wafer 3*b* may differ.

In use, a liquid to be atomised first penetrates the sieve-side orifices 5*a* of the sieve-side membrane 5 thereby entering the first cavity portion 4*a*. Here, a small pressure drop is obtained. The liquid travels through the first cavity portion 4*a* and into the second cavity portion 4*b* and finally penetrates through the spray-side orifices 7*a* of the spray-side membrane 7. Jet streams are thus created, which due to Rayleigh instability break up into small droplets forming an aerosol.

Figure 2B:
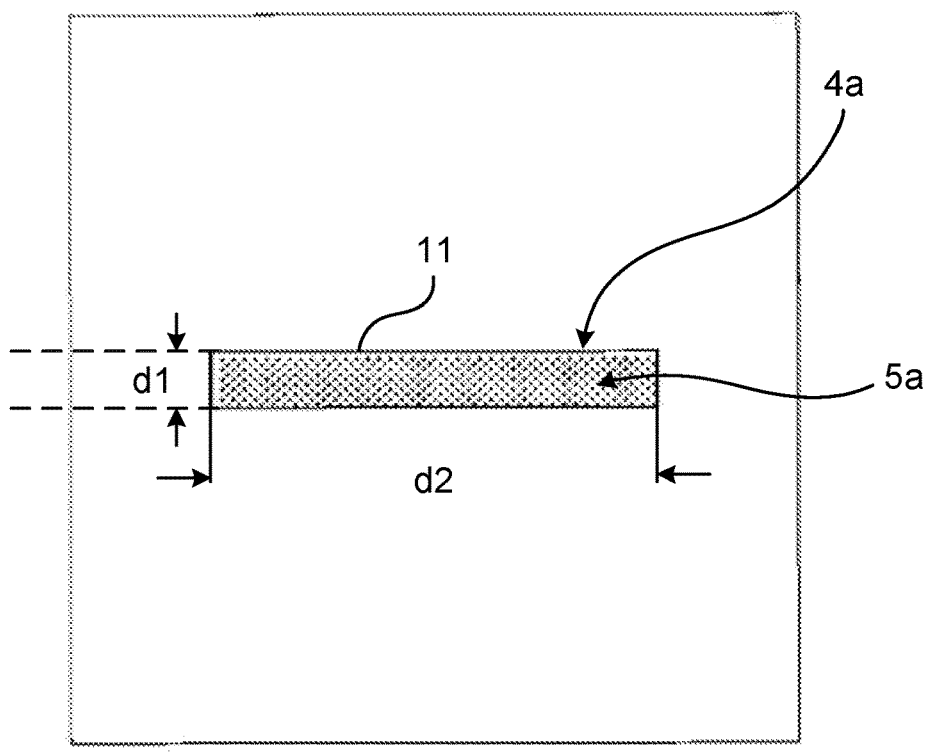
FIGS. 2b and 2c are sections along lines B-B and C-C, respectively.

FIG. 2*b* shows a section of the nozzle device 1-1 along lines B-B. This section is a cross-section with respect to the fluid communication axis 9, and thus corresponds to a cut parallel to the main surface extensions of the sieve-side membrane 5*a* and the spray-side membrane 7*a*. The first cavity portion 4*a* can thus be seen in a section. The cross-sectional area 11 of the exemplified first cavity portion 4*a* is determined by the product of the dimensions d1 and d2.

Figure 2C:
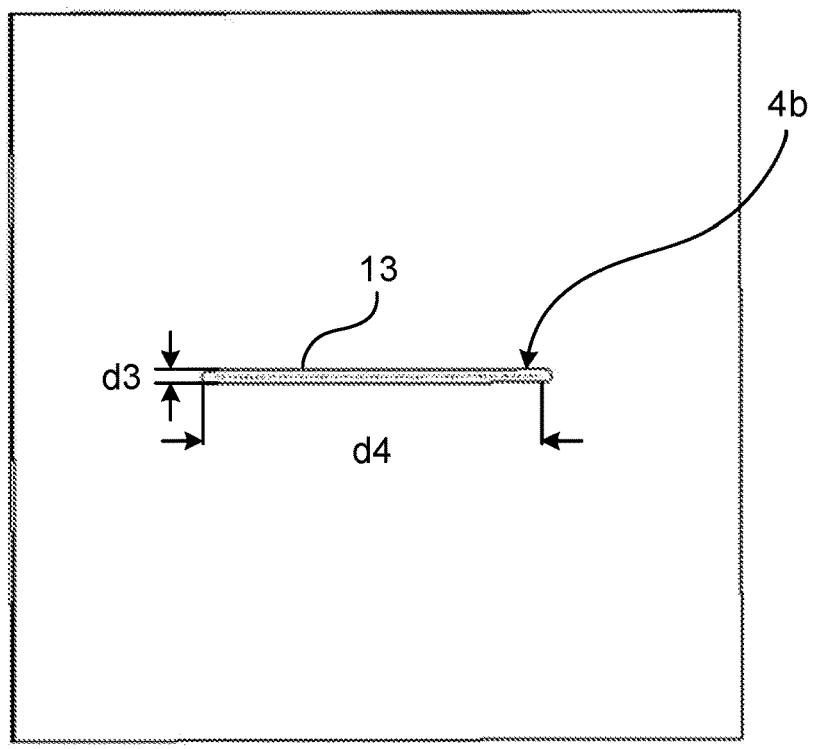

FIG. 2*c* shows a section of the nozzle device 1-1 along lines C-C. This section is parallel with the section along lines B-B. Here, the second cavity portion 4*b* can be seen in a section. The cross-sectional area 13 of the exemplified second cavity portion 4*b* is essentially determined by the product of the dimensions d3 and d4.

The cross-sectional area 11 of the first cavity portion 4*a* is greater than the cross-sectional area 13 of the second cavity portion 4*b*. The cross-sectional area 11 of the first cavity portion 4*a* is constant along the fluid communication axis 9. The cross-sectional area 13 of the second cavity portion 4*b* is constant along the fluid communication axis 9.

Figure 3:
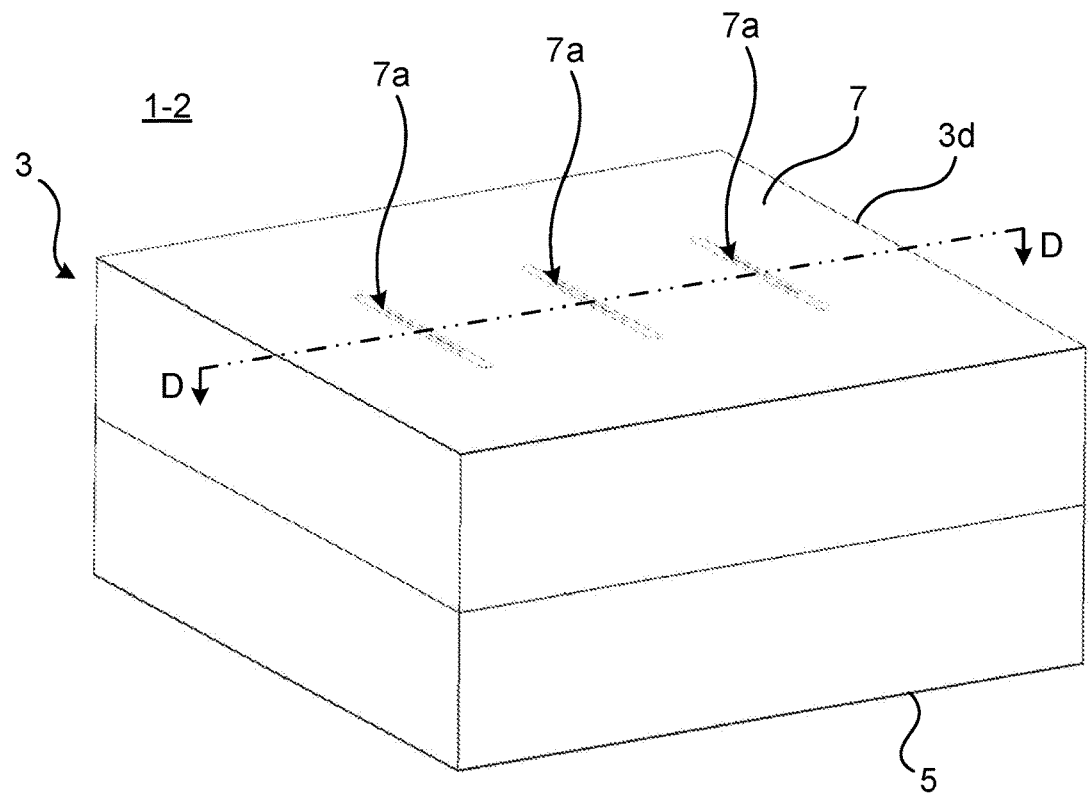
FIG. 3 is a perspective view of another schematic example of a nozzle device.

FIG. 3 shows a second example of a nozzle device configured to atomise a liquid. The nozzle device 1-2 is similar to the first example. The second example however includes a plurality of second cavity portions and a plurality of first cavity portions. Each such second cavity portion extends to the spray-side membrane 7 from a respective first cavity portion. Each pair of interconnected second cavity portion and first cavity portion provides fluid communication between spray-side orifices 7*a* of the spray-side membrane 7 and sieve-side orifices 5*a* of the sieve-side membrane 5.

Figure 4:
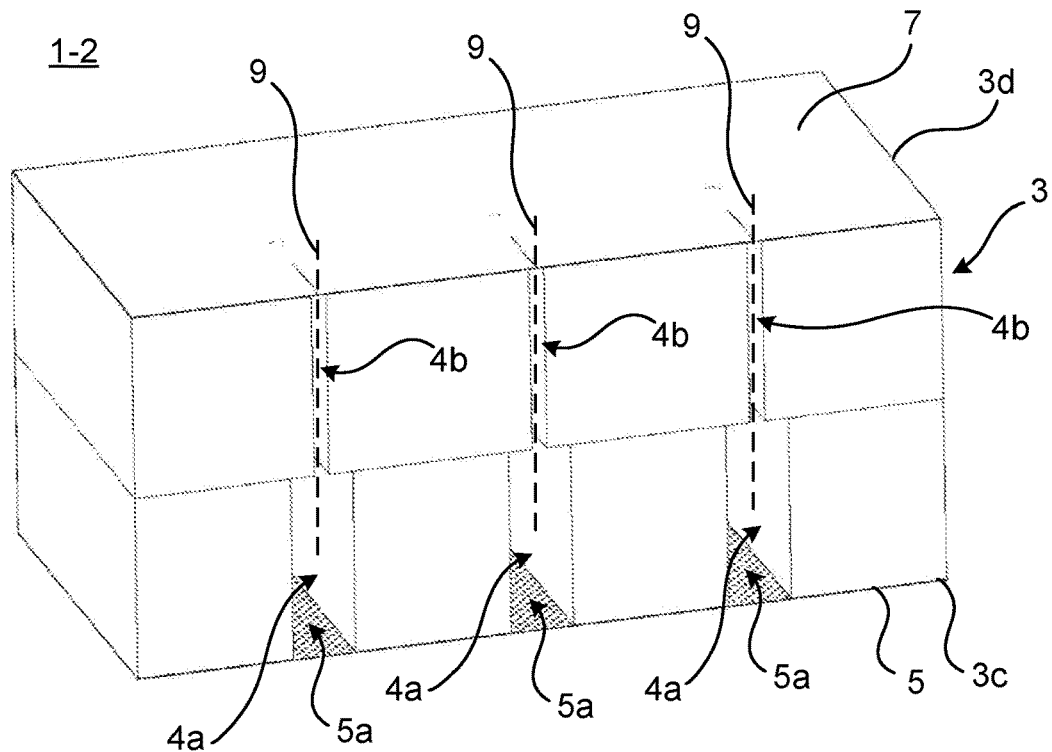
FIG. 4 depicts a section through the nozzle device in FIG. 3 along lines D-D.

FIG. 4 shows the fluid communication configuration between the spray-side membrane 7 and the sieve-side membrane 5. The substrate 3 comprises a plurality of first cavity portions 4*a* and a plurality of second cavity portions 4*b*. The number of first cavity portions 4*a* is equal to the number of second cavity portions 4*b*. Each pair of first cavity portion 4*a* and second cavity portion 4*b* defines a respective channel which provides fluid communication between sieve-side orifices 5*a* of the sieve-side membrane 5 and spray-side orifices 7*a* of the spray-side membrane 7. Each such channel has a respective fluid communication axis 9 extending from the sieve-side 3*c* to the spray-side 3*d* of the substrate 3.

The cross-sectional area, with respect to the fluid communication axis 9, of each first cavity portion 4*a* is greater than the cross-sectional area of the corresponding second cavity portion 4*b*.

Figure 5:
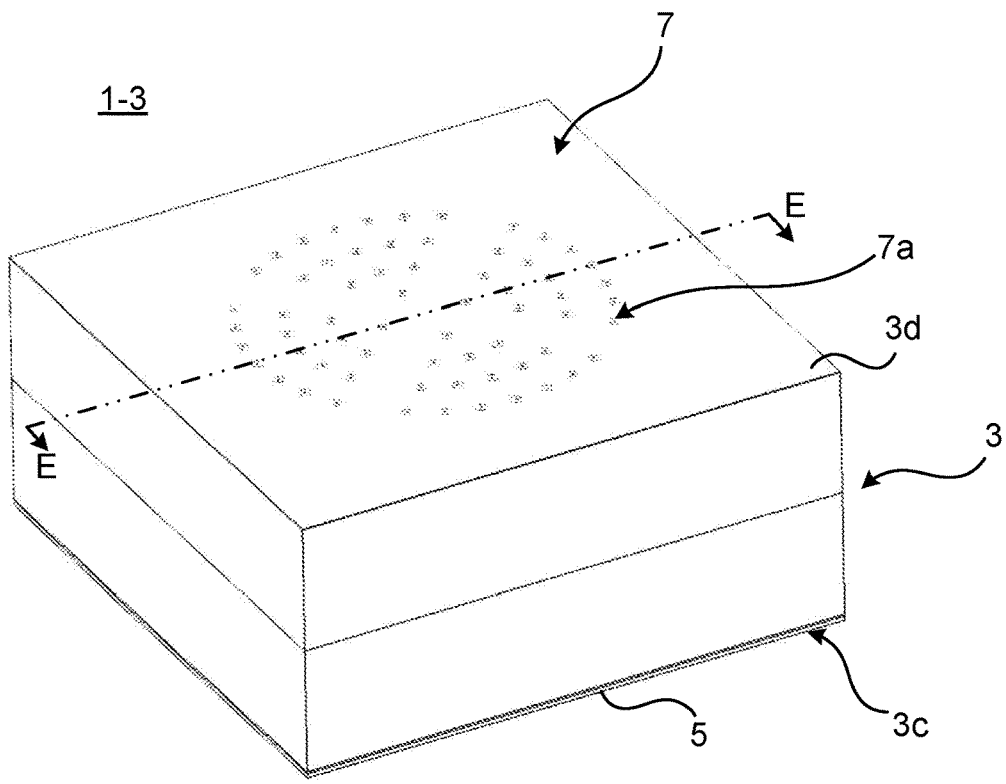
FIG. 5 is a perspective view of yet another schematic example of a nozzle device.

FIG. 5 depicts a third example of a nozzle device. The nozzle device 1-3 is similar to the second example. The nozzle device 1-3 includes a plurality of second cavity portions and a plurality of first cavity portions. A plurality of second cavity portions extends to the spray-side membrane 7 from a single first cavity portion. The plurality of second cavity portions interconnected with a first cavity portion provides fluid communication between spray-side orifices 7*a* of the spray-side membrane 7 and sieve-side orifices 5*a* of the sieve-side membrane 5.

Figure 6A:
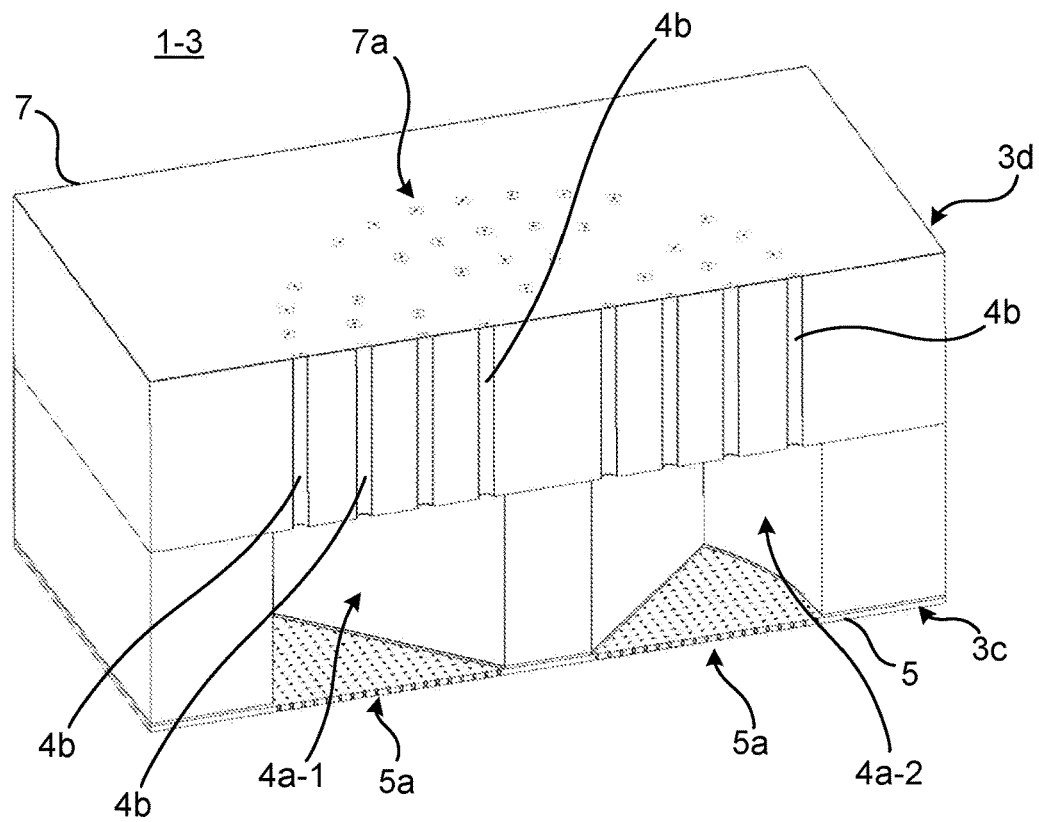
FIG. 6a depicts a section through the nozzle device in FIG. 5 along lines E-E.

FIG. 6*a* illustrates a section along lines E-E. It can be seen that a plurality of second cavity portions 4*b* extend from the spray-side membrane 7 to one first cavity portion 4*a*-1 and a plurality of second cavity portions 4*b* extend from the spray-side membrane 7 to another first cavity portion 4*a*-2. The two first cavity portions are in liquid isolation from each other. They are hence not in fluid communication. Each first cavity portion 4*a* extends to the sieve-side membrane 5. In this manner, fluid communication may be provided from the sieve-side 3c to the spray-side 3d. In particular, fluid communication is provided between sieve-side orifices 5a of the sieve-side membrane 5 and spray-side orifices 7a of the spray-side membrane 7.

Figure 6B:
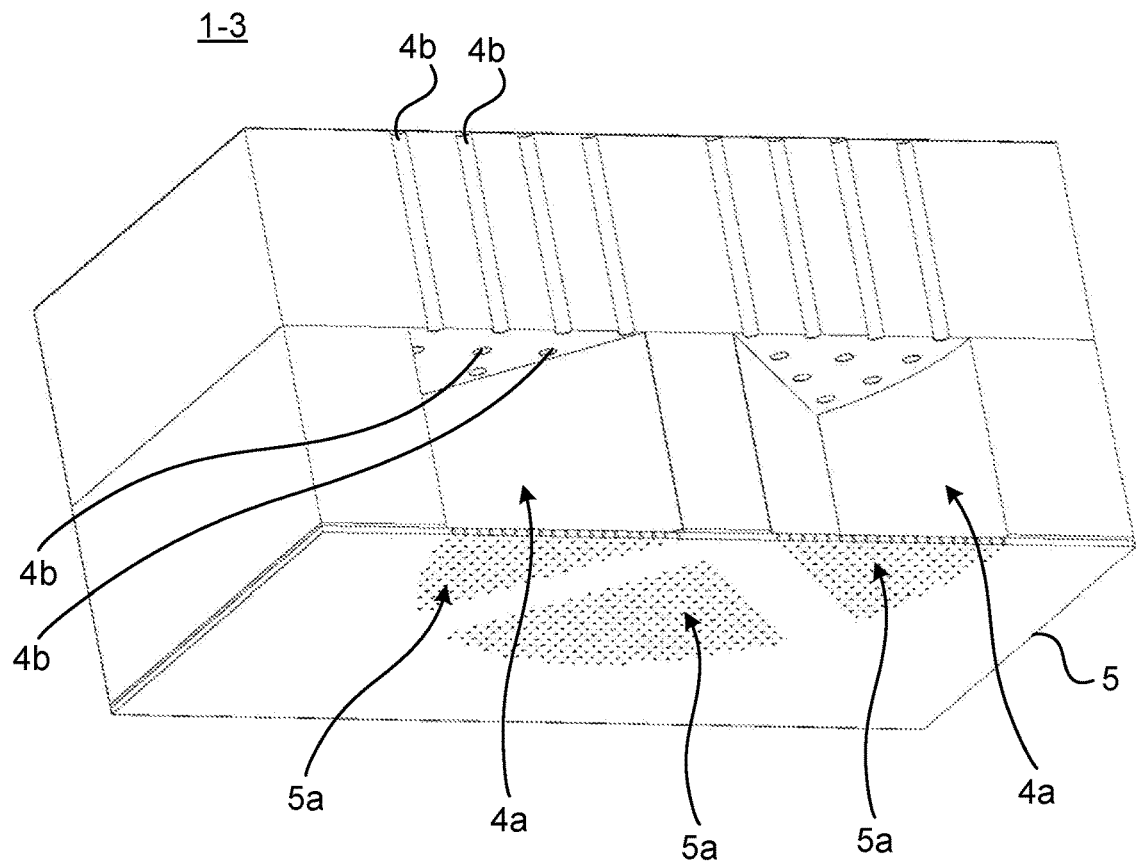
FIG. 6b depicts a section through the nozzle device in FIG. 5 along lines E-E, in a perspective view from a sieve-side of the nozzle device.

FIG. 6b shows the configuration of the sieve-side orifices 5a, which are arranged in a pie-like manner, corresponding to the configuration of the spray-side orifices 7a shown in FIG. 6a.

In general, the layout or configuration of the sieve-side orifices may be essentially any suitable for the particular application. The layout or configuration of the spray-side orifices may be essentially any suitable for the particular configuration. It is however beneficial to provide second cavity portion(s) that extends parallel with the corresponding fluid communication axis along its/their entire extension. The same generally also applies to the first cavity portion(s).

Figure 7:
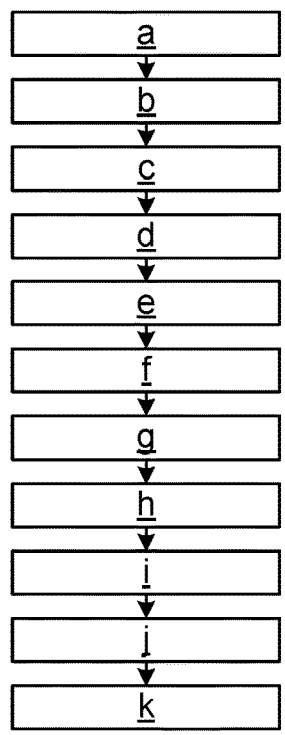
FIG. 7 is a flowchart of a method of manufacturing a nozzle device.

An example of manufacturing a nozzle device 1-1, 1-2, 1-3 will now be described with reference to FIG. 7. It should be noted that the nozzle device 1-1, 1-2, 1-3 may be manufactured according to a plurality of different processes.

In a step a) a first wafer 3a is provided. The first wafer 3a can be made of a semiconducting material. An example of a suitable semiconducting material is silicon. The first wafer 3a may be double side polished.

In a step b) each of a first side and a second side opposite to the first side of the first wafer 3a is provided with a protective layer and/or an adhesive layer.

The protective layer may for example be silicon oxide. The protective layer may for example be deposited onto the first wafer 3a by means of thermal oxide deposition.

In a step c) a sieve-side membrane layer is provided onto the protective layer provided on the first side of the first wafer 3a. The sieve-side membrane layer may for example be deposited onto the protective layer by means of plasma-enhanced chemical vapour deposition. The sieve-side membrane layer may for example be silicon nitride.

In a step d) the sieve-side orifices 5a are provided in the sieve-side membrane layer thereby obtaining the sieve-side membrane 5. The sieve-side orifices 5a may for example be obtained using photolithography by providing a suitably patterned photoresist and etching the pattern of sieve-side orifices 5a into the sieve-side membrane layer using for instance reactive ion etching. Step d) may also involve removing of the photoresist after the patterning of the sieve-side membrane layer.

In a step e) the first cavity portion 4a is provided in the first wafer 3a, extending through the protective layer on the first side of the first wafer 3a to the sieve-side membrane 5. In case of several first cavity portions 4a, each first cavity portion 4a is provided in this step.

Step e) may involve providing a photoresist onto the second side of the first wafer 3a with a pattern/through-hole to provide the first cavity portion. Using for example etching techniques to remove a portion of the first wafer 3a, for example deep reactive ion etching, the first cavity portion 4a or cavities 4a may be created. The photoresist is thereafter removed from the second side of the first wafer 3a. Part of the protective or adhesive layer, exposed by the pattern in the photoresist, is also removed from the second side during step e). The removal of this layer may for example be performed using reactive ion etching Finally, the protective layer may be removed from below the sieve-side membrane 5 using for example hydrogen fluoride etching. The remaining protective or adhesive layer still remaining after step e) is also removed from the second side. The removal of this layer may for example be performed using reactive ion etching.

In a step f) a second wafer 3b is provided. The second wafer 3b can be made of a semiconducting material. An example of a suitable semiconducting material is silicon. The second wafer 3b may be double side polished.

In a step g) each of a first side and a second side opposite to the first side of the second wafer 3b is provided with a protective layer and/or adhesive layer.

The protective layer may for example be silicon oxide. The protective layer may for example be deposited onto the second wafer 3b by means of thermal oxide deposition.

In a step h) a spray-side membrane layer is provided onto the protective layer provided on the first side of the second wafer 3b. The spray-side membrane layer may for example be deposited onto the protective layer by means of plasma-enhanced chemical vapour deposition. The spray-side membrane layer may for example be silicon nitride.

In a step i) the spray-side orifices 7a are provided in the spray-side membrane layer thereby obtaining the spray-side membrane 7. The spray-side orifices 7a may for example be obtained using photolithography by providing a suitably patterned photoresist and etching the pattern of spray-side orifices 7a into the spray-side membrane layer using for instance reactive ion etching. Step i) may also involve removing of the photoresist after the patterning of the spray-side membrane layer.

In a step j) the second cavity portion 4b is provided in the second wafer 3b, extending through the protective layer on the first side of the second wafer 3b to the spray-side membrane 7. In case of several second cavity portions 4b, each second cavity portion 4b is provided in this step.

Step j) may involve providing a photoresist onto the second side of the second wafer 3b with a pattern to provide the second cavity portion(s). Using for example etching techniques to remove a portion of the second wafer 3b, for example deep reactive ion etching, the second cavity portion 4b or second cavity portions 4b may be created. The photoresist is thereafter removed from the second side of the second wafer 3b. Part of the protective or adhesive layer, exposed by the pattern in the photoresist, is also removed from the second side during step e). The removal of this layer may for example be performed using reactive ion etching.

Finally, the protective layer may be removed from below the spray-side membrane 7 using for example hydrogen fluoride etching. The remaining protective or adhesive layer still remaining after step j) is also removed from the second side. The removal of this layer may for example be performed using reactive ion etching.

In a step k) the second side of the first wafer 3a is bonded with the second side of the second wafer 3b thereby forming the substrate 3. The sieve-side membrane 5 forms a sieve-side and the spray-side membrane 7 forms a spray-side of the nozzle device 1-1, 1-2, 1-3.

Figure 8:
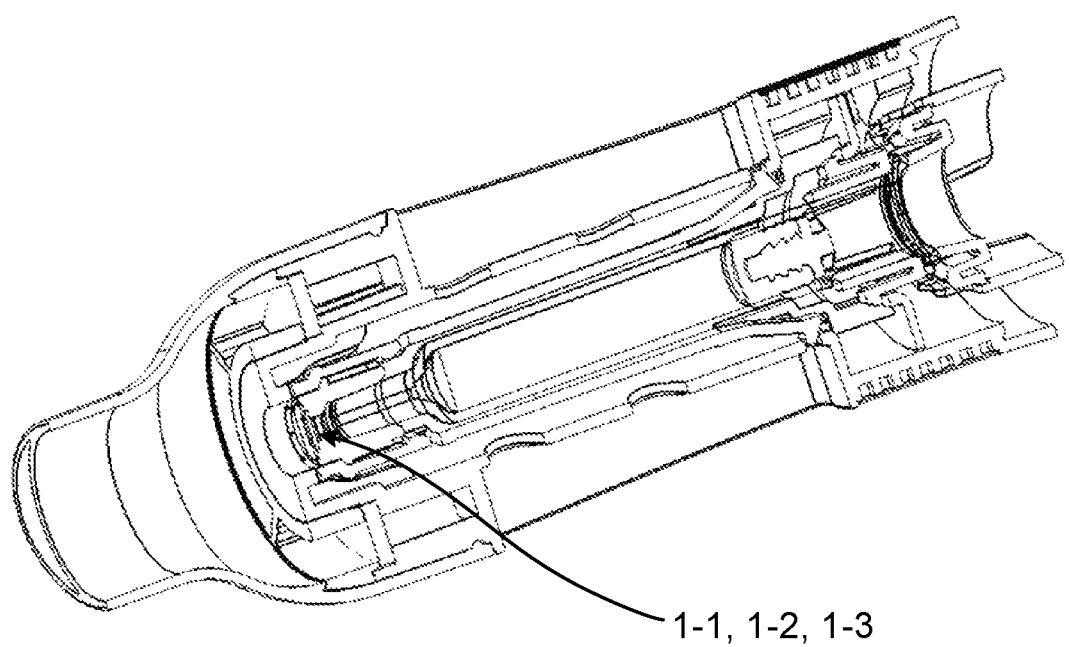
FIG. 8 is schematic example of a longitudinal section of a medicament delivery device comprising a nozzle device.

The nozzle device 1-1, 1-2, 1-3 may for example be used in medical applications. For instance, the nozzle device 1-1, 1-2, 1-3 may be provided in a medicament delivery device such as an inhaler or an eye dispenser. FIG. 8 shows an example of a medicament delivery device 15 in a longitudinal section comprising a nozzle device 1-1, 1-2, 1-3 attached to a nozzle device holder.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A nozzle device for atomisation of a liquid, wherein the nozzle device comprises:
   a substrate comprising a first wafer bonded to a second wafer,
   a sieve-side membrane comprising a plurality of sieve-side orifices, the sieve-side membrane being provided on a sieve-side of the substrate,
   a spray-side membrane comprising a plurality of spray-side orifices, the spray-side membrane being provided on a spray-side of the substrate,
   wherein the first wafer has a first cavity portion extending to the sieve-side membrane, and the second wafer has a second cavity portion extending from the first cavity portion to the spray-side membrane, thereby providing fluid communication, along a fluid communication axis (9), between the sieve-side orifices and the spray-side orifices, the first cavity portion having a larger cross-sectional area than a cross-sectional area of the second cavity portion, the cross-sections being with respect to the fluid communication axis.

2. The nozzle device as claimed in claim 1, wherein any cross-sectional area of the first cavity portion is larger than any cross-sectional area of the second cavity portion.

3. The nozzle device as claimed in claim 1, wherein each spray-side orifice has a cross-sectional area greater than or equal to the cross-sectional area of any of the sieve-side orifices.

4. The nozzle device as claimed in claim 1, wherein the number of sieve-side orifices is greater than the number of spray-side orifices.

5. The nozzle device as claimed in claim 1, wherein the sieve-side orifices occupy a larger area on the sieve-side membrane than the spray-side orifices occupy on the spray-side membrane.

6. The nozzle device as claimed in claim 1, wherein the substrate is made of a semiconductor material.

7. The nozzle device as claimed in claim 1, wherein the sieve-side membrane and the spray-side membrane comprise one of a non-oxide ceramic, an oxide, silicon or metal.

8. The nozzle device as claimed in claim 1, wherein the substrate comprises a plurality of second cavity portions extending from the first cavity portion to the spray-side membrane, thereby providing fluid communication, along a respective fluid communication axis, between the sieve-side orifices and the spray-side orifices, the first cavity portion having a larger cross-sectional area than a cross-sectional area of any of the second cavity portions.

9. The nozzle device as claimed in claim 8, wherein a total cross-sectional area of the second cavity portions with respect to the fluid communication axes is smaller than an area of the sieve-side membrane provided with the sieve-side orifices.

10. A medicament delivery device comprising a nozzle device as claimed in claim 1.

11. The medicament delivery device as claimed in claim 10, wherein the medicament delivery device is an inhaler or an eye dispenser.

12. A nozzle device for atomisation of a liquid, wherein the nozzle device comprises:
   a substrate, where the substrate comprises,
      a first wafer having a sieve-side membrane comprising a sieve-side orifice, the sieve-side membrane being provided on a sieve-side of the substrate; and
      a second wafer having a spray-side membrane comprising a spray-side orifice, the spray-side membrane being provided on a spray-side of the substrate,
   wherein the first wafer is bonded to the second wafer,
   wherein the first wafer has a first cavity portion extending to the sieve-side membrane and the second wafer has a second cavity portion extending from the first cavity portion to the spray-side membrane, where both cavity portions are in fluid communication with each other and with the sieve-side orifice and the spray-side orifice along a fluid communication axis,
   wherein the first cavity portion has a larger cross-sectional area than a cross-sectional area of the second cavity portion, where both cross-sections of the cavities being with respect to the fluid communication axis.

13. Claims The nozzle device as claimed in claim 12, wherein the sieve-side membrane has a total number of sieve-side orifices that is greater than a total number of spray-side orifices in the spray-side membrane.

14. The nozzle device as claimed in claim 13, wherein a total cross-sectional area of the second cavity portions with respect to the fluid communication axes is smaller than an area of the sieve-side membrane provided with the sieve-side orifices.

15. The nozzle device as claimed in claim 13, wherein the first wafer and the second wafer each comprise one of a non-oxide ceramic, an oxide, silicon or metal.

16. The nozzle device as claimed in claim 13, wherein the spray-side orifices of the spray-side membrane are arranged in a circular pattern.

* * * * *